Nov. 23, 1926.
W. F. CLARK
1,607,606
PRESSURE RESPONSIVE MAKE AND BREAK DEVICE
Filed May 3, 1919
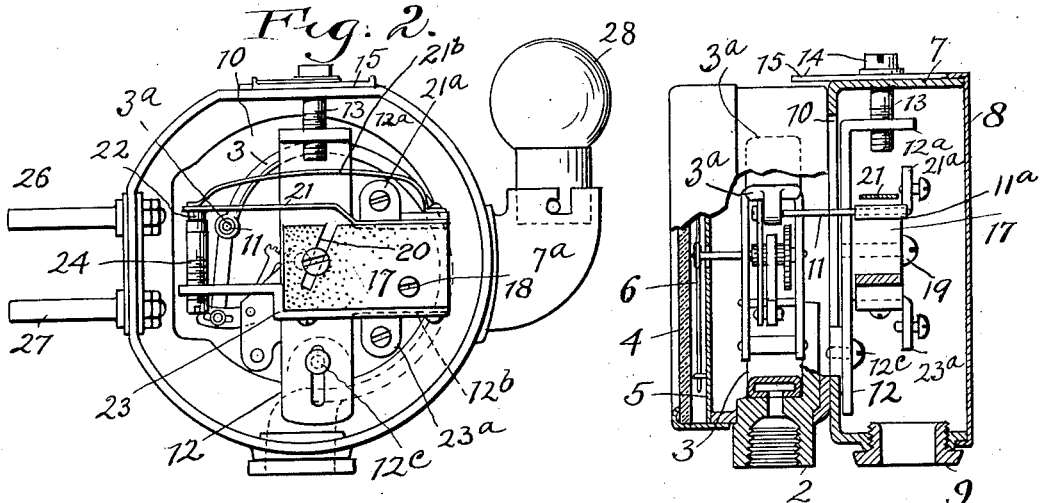
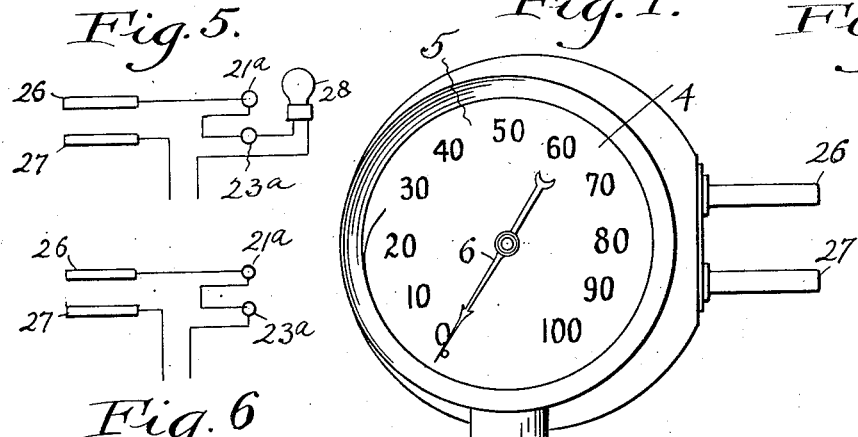
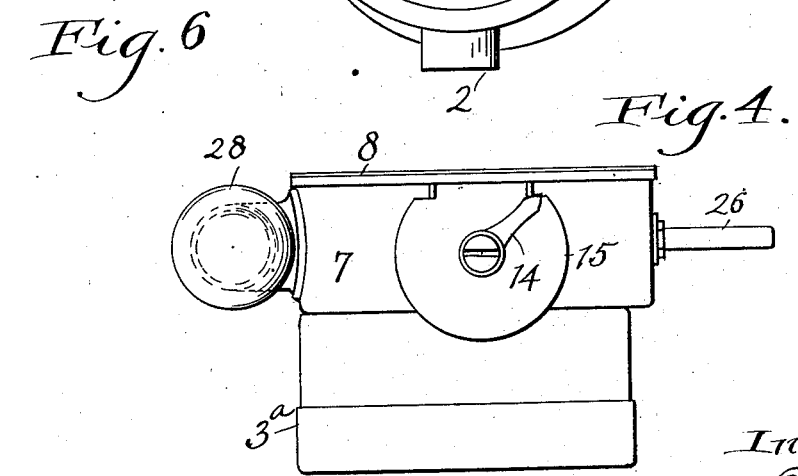
Inventor:
Warren F. Clark
By Thurston Kwis & Hudson
attys.

Patented Nov. 23, 1926.

1,607,606

UNITED STATES PATENT OFFICE.

WARREN F. CLARK, OF CLEVELAND, OHIO, ASSIGNOR, BY MESNE ASSIGNMENTS, TO AUTOMATIC ELECTRIC HEATER COMPANY, OF WARREN, PENNSYLVANIA, A CORPORATION OF DELAWARE.

PRESSURE-RESPONSIVE MAKE AND BREAK DEVICE.

Application filed May 3, 1919. Serial No. 294,411.

The present invention relates to a pressure responsive device for controlling the making and breaking of an electric circuit.

The object of the invention is to provide a device of the character, in which the parts are simple, are made adjustable and are so arranged as to produce a device which is very sensitive and quick to respond to changes of fluid pressure induced by the apparatus with which the herein described device is associated.

Further objects of the invention will appear more at large as the description proceeds.

Reference should be had to the accompanying drawings forming a part of this specification in which Fig. 1 is a front elevation; Fig. 2 is a rear elevation with the cover removed; Fig. 3 is a side elevation with portions broken away; Fig. 4 is a top plan view; Fig. 5 is an electric circuit diagram; Fig. 6 is an electric circuit diagram.

The device herein described is particularly adapted to be used in connection with an apparatus which includes a container for a fluid, such as water, which container is heated by an electric heating apparatus of some description such for instance, as an electric coil. When used in connection with such an apparatus, the device is connected with the container, so that, as pressure is developed in the container, the device herein described is responsive to that pressure, and in accordance with the adjustment of the device, will respond when a pre-determined pressure condition is obtained, so as to make or break, as the case may be, the electric circuit which energizes the heating element or coil.

No illustration or extended description of the apparatus in connection with which the device is intended to be used, is given, as it will be clear from the description of the essential element of such an apparatus above mentioned, that such an apparatus may assume a variety of forms and further that the present invention is not limited to any precise form of such pressure generating apparatus.

Referring to the drawings 1 indicates a casing and at the lower portion of the casing, there is a nipple 2, which nipple extends upon the outside of the casing. The nipple is interiorly threaded. Communicating with the nipple 2, is a hollow tube 3, which is made of a flexible metal and is known in the art as a Bourdon tube.

At the front of the casing 1, there is a closing glass 4, and behind the glass there is a gauge chart 5, which is suitably graduated to indicate in terms of pound, the pressure of the fluid exerting its influence upon the Bourdon tube. Co-operating with the chart 5, is an indicating hand 6, this hand being mounted upon a shaft which in turn is actuated by suitable mechanism which is connected with the end $3^a$ of the Bourdon tube.

The construction to which reference has just been made is very well understood in the art and consequently no further description of the same need be given.

A casing member 7, is attached to the casing member 1, or if desired, the casing member 7 may be made integral with the casing 1. This casing member at one end is open and a cover 8 fits over the opening. At its lower end the casing is provided with an insulated threaded nipple 9.

The inner wall of the casing 7 is open as indicated at 10 and extending through this opening is a rod or pin 11 which is secured to the end $3^a$ of the Bourdon tube. The pin 11 extends into the casing 7 and co-operates with electrical contact members, hereinafter to be described.

Within the casing 7 there is a support 12, which at its lower end is slotted as shown. Through this slot, there extends a screw $12^c$, which occupies a threaded opening in the rear wall casing 7. At the upper end of the member 12, there is an extending flange $12^a$. This flange has a threaded opening and receives a threaded member 13. This threaded member finds support in the top wall of the casing 7, and extends upon the outside of the casing. There is secured an index member 14 to the end of the member 13, which index finger may be turned so as to move the member 13. Beneath the index finger there is a circular plate 15, which is secured to the top of the casing and the plate 15 being suitably graduated to indicate pounds pressure, for the purpose of enabling the index finger to be accurately positioned, so that the mechanism within the casing may be correctly positioned to secure a response of the mechanism to interrupt the electric circuit when the pressure indicated has been attained.

The member 12 also has an extension 12<sup>b</sup> which extends at substantially right angles to the main portion thereof. A block of insulating material, such as fibre is indicated at 17. This block 17 is secured to the extension 12<sup>b</sup> by means of a screw which is indicated at 18. This block is also held to the main portion of the member 12 by means of another screw 19 which occupies an arcuate slot 20. It is therefore apparent that the block 17 may be adjusted by releasing the screw 19, and moving the block about its pivot screw 18, at which time the screw 19 moves in the slot 20.

Upon the block 17 there is mounted a spring member 21 which adjacent one end is formed with an upstanding ear 21<sup>a</sup> and at the opposite end of the spring member 21, there is a contact member 22.

Upon another portion of the block 17 there is secured a member 23 which at a portion thereof is also formed with an ear 23<sup>a</sup>. This member 23 at one end thereof supports a contact member 24, which contact member is adjustable. This arrangement is effected by having a portion of the contact member 24 threaded and having the opening in the member 23 through which it extends, also threaded.

The ears 21<sup>a</sup> and 23<sup>a</sup> are suitably fashioned to receive and retain the ends of the wires forming conductors for parts of the electrical circuit controlled by the contacts 22 and 24.

The rod 11 which, as before described is carried by the Bourdon tube, extends beneath the spring member 21 and in order to avoid any short circuit, the pin 11 is at its outer end provided with a sleeve 11<sup>a</sup>, of non-conducting material and this sleeve is adapted to engage with the spring 21, under conditions which will later be described.

In operation, the nipple 2 is connected with a receptacle containing fluid which is heated by a coil and the heating of which fluid cause a pressure to be set up in the container. The interior of the Bourdon tube being thus communicated with the interior of the container, will expand in accordance with the pressure conditions existing within the container.

The contacts 22 and 24 are placed in series in the electrical circuit which contains the heating element that is associated with the receptacle before mentioned and so long as the contacts 22 and 24 are engaged the circuit is maintained and current is supplied to the heating coil.

When the pressure builds up within the receptacle to an extent such that the pin 11 engages the spring 21 and separates the contacts 22 and 24, the electric circuit to the heating coil is broken and the pin holds the contacts apart until the pressure conditions within the receptacle are such that the Bourdon tube in response to the diminishing pressure moves the pin 11 away, so that the spring member 21 returns contact 22 to engagement with the contact 24. The spring 21 may be reinforced by a second spring 21<sup>b</sup> bearing against the top thereof and serving to more positively hold the contacts in engagement.

It will be understood that instruments of the character that have just been described must be suitably and individually calibrated before they are put in use, so as to insure their accuracy and proper operation when in use.

In order to effect the proper adjustment during calibrating the instrument, it should be noted that the contact 24 is made adjustable with respect to the contact 22, and furthermore the contacts which are carried by the block 17 are as a whole, made adjustable with respect to the pin 11.

By making the contact 24 adjustable with respect to contact 22, initial pressure may be placed upon spring 21 so as to increase its resistance to flexure by the pin 11, thereby making possible an adjustment in the tension of the spring 21 against which tension the pin 11 must work.

The fact that the whole structure carrying the contacts 22 and 24 can be adjusted makes possible the additional adjustment with respect to the distance the pin 11 must move before it contacts with the spring 21.

These two adjustments enable the calibration to be accurately made and to give a close adjustment that makes the device quickly responsive when the desired condition is obtained.

As will be noted the member 12 is capable of sliding when the member 13 is turned. This permits an adjustment of both contacts with respect to the pin 11, and by suitably calibrating the device with respect to the indications on the plate 15, the contacts may be so positioned with respect to the pin 11 that the contacts will be separated under a pressure condition which would be indicated by the index member 14, with respect to its position on the plate 15.

This construction affords an external adjusting means by which the user of the device may utilize the device for securing different pressure responses and does not necessitate the adjustment of the interior mechanism of the device.

The conductors which are connected with the terminals or ears, 21<sup>a</sup> and 23<sup>a</sup> may extend through the insulating bushing 9.

In the present instance, the device is shown as provided with pins 26 and 27 which are adapted to be inserted in an electric socket of standard construction and these pins are connected with the terminals 21<sup>a</sup> and 23<sup>a</sup> in the manner indicated in the diagram sketch forming Figure 6.

The use of the pins 26 and 27 is optional as it is entirely possible to have the conductors which are connected with the terminals 21ª extended through the nipple 9.

It will be apparent that when the device which has been described, is used in connection with a pressure generator apparatus before described, there will be periods when the contacts are separated and other periods when they are in engagement.

It is desirable at times, to have some visual indication of the period when the contacts are engaged, that is to say when the coil is receiving current and for this purpose the casing 7 may have an elbow extension such as indicated at 7ª, which elbow will serve as a socket to receive a lamp 28. The socket with which the lamp 28 co-operates may be connected in the electric circuit in the manner indicated in the diagram forming Fig. 5 of the drawings.

Having described my invention, I claim:—

1. In a device of the character described, the combination with a Bourdon tube, of a movable actuating member operatively connected to the Bourdon tube, a carrier member, means for adjusting said carrier, a support mounted upon the carrier member, contact members mounted upon the support, the said movable member being positioned to separate the contacts upon a predetermined movement of the Bourdon tube, said contacts and mounting therefor being adjustable with respect to the carrier and with respect to the said movable member.

2. In a device of the character described, the combination with a Bourdon tube, of a movable actuating member operatively connected to the Bourdon tube, a pair of contact members, said movable member being positioned and adapted to separate the contacts upon a predetermined movement of the Bourdon tube, a mounting for said contacts, a carrier to which the said mounting is affixed, the mounting being adjustable with respect to the carrier and with respect to the said movable member, said carrier being adjustably mounted.

3. In a device of the character described, the combination with a Bourdon tube, of a movable actuating member operatively connected to the Bourdon tube, a carrier member, means for moving said carrier member, a support, said support being mounted upon the carrier member and adjustable therewith, a pair of contact members mounted on the support and adjustable with respect to each other, the said movable member being positioned and adapted to separate the contact members upon a predetermined movement of the Bourdon tube.

4. In a device of the character described the combination with a Bourdon tube, of a movable actuating member operatively connected to the Bourdon tube, a carrier member adjustably mounted, means for moving the carrier member, a block of insulating material mounted upon the carrier member and adjustable with respect thereto, contact members carried by the said block, the said movable member being provided with an insulated portion which is positioned and adapted to engage with one of the contact members upon a predetermined movement of the Bourdon tube.

In testimony whereof, I hereunto affix my signature.

WARREN F. CLARK.